US011488585B2

(12) United States Patent
O'Connor et al.

(10) Patent No.: US 11,488,585 B2
(45) Date of Patent: Nov. 1, 2022

(54) REAL-TIME DISCUSSION RELEVANCE FEEDBACK INTERFACE

(71) Applicant: INTERNATIONAL BUSINESS MACHINES CORPORATION, Armonk, NY (US)

(72) Inventors: James Philip O'Connor, White Plains, NY (US); Rachel Ostrand, Milford, PA (US)

(73) Assignee: International Business Machines Corporation, Armonk, NY (US)

(*) Notice: Subject to any disclaimer, the term of this patent is extended or adjusted under 35 U.S.C. 154(b) by 72 days.

(21) Appl. No.: 17/099,102

(22) Filed: Nov. 16, 2020

(65) Prior Publication Data
US 2022/0157301 A1 May 19, 2022

(51) Int. Cl.
*G06F 15/16* (2006.01)
*G10L 15/18* (2013.01)
(Continued)

(52) U.S. Cl.
CPC .......... *G10L 15/1815* (2013.01); *G10L 21/10* (2013.01); *G10L 25/27* (2013.01);
(Continued)

(58) Field of Classification Search
None
See application file for complete search history.

(56) References Cited

U.S. PATENT DOCUMENTS 7,711,312 B2  5/2010 Higgins et al.
8,214,242 B2  7/2012 Agapi et al.
(Continued)

FOREIGN PATENT DOCUMENTS

CN       104836720 A       8/2015
WO    WO-0117172 A1 *  3/2001  .......... G06Q 10/107
(Continued)

OTHER PUBLICATIONS

Disclosed Anonymously, "System and method to identify the probability of deviation in content, context and conflicts on the given meeting agenda and provide recommendation to alert or action based on identified difference", IP.com No. IPCOM000261965D, Publication Date Apr. 21, 2020, 6 pages.

(Continued)

*Primary Examiner* — Phyllis A Book
(74) *Attorney, Agent, or Firm* — Daniel J. Hakimi (57) ABSTRACT

A method, computer system, and a computer program product for discussion relevance feedback associated with an electronic meeting is provided. The method may include determining a meeting topic associated with the electronic meeting and receiving audio data recording the vocal interactions of one or more meeting attendees. The method may further include generating a textual representation of the received audio data and then identifying a current discussion topic based on the generated textual representation. The method may further include determining a semantic distance between the identified current discussion topic and the determined meeting topic and generating discussion relevance feedback based on the determined semantic distance.

20 Claims, 7 Drawing Sheets

(51) Int. Cl.
*H04L 12/18* (2006.01)
*G10L 25/27* (2013.01)
*G10L 25/72* (2013.01)
*G10L 25/51* (2013.01)
*G10L 21/10* (2013.01)

(52) U.S. Cl.
CPC .............. *G10L 25/51* (2013.01); *G10L 25/72* (2013.01); *H04L 12/1831* (2013.01)

(56) References Cited

U.S. PATENT DOCUMENTS

| | | | |
|---|---|---|---|
| 9,483,532 | B1 | 11/2016 | Zhang |
| 10,043,517 | B2 | 8/2018 | Blandin et al. |
| 2006/0271526 | A1* | 11/2006 | Charnock .............. G06Q 30/02 |
| 2008/0189407 | A1 | 8/2008 | Charlton et al. |
| 2013/0325972 | A1* | 12/2013 | Boston .................. G06Q 10/10 |
| | | | 709/204 |
| 2014/0123027 | A1* | 5/2014 | Kozloski ............ G06Q 10/1095 |
| | | | 715/753 |
| 2014/0344718 | A1* | 11/2014 | Rapaport ................ H04L 51/52 |
| | | | 715/753 |
| 2015/0348538 | A1 | 12/2015 | Donaldson |
| 2017/0039527 | A1* | 2/2017 | Rangan .............. G06Q 10/1095 |
| 2018/0046957 | A1* | 2/2018 | Yaari .................. G06Q 10/1095 |
| 2019/0108493 | A1* | 4/2019 | Nelson .................. G06Q 10/1095 |
| 2019/0147882 | A1* | 5/2019 | Pankanti ................. G10L 15/18 |
| | | | 704/231 |
| 2019/0295041 | A1* | 9/2019 | Sim ........................ G06N 20/00 |
| 2019/0305976 | A1* | 10/2019 | Bender ................ G10L 15/1807 |
| 2020/0081685 | A1* | 3/2020 | Abuelsaad ............. G10L 15/08 |
| 2020/0092422 | A1 | 3/2020 | Dickins et al. |
| 2020/0111046 | A1* | 4/2020 | Ball-Marian ...... G06Q 10/0633 |
| 2021/0056860 | A1* | 2/2021 | Fahrendorff ........... G09B 7/077 |
| 2022/0027859 | A1* | 1/2022 | Daga .................. G06Q 10/1095 |

FOREIGN PATENT DOCUMENTS

| | | |
|---|---|---|
| WO | 2016022588 A1 | 2/2016 |
| WO | WO-2020206487 A1 * | 10/2020 |

OTHER PUBLICATIONS

Mell et al., "The NIST Definition of Cloud Computing", National Institute of Standards and Technology, Special Publication 800-145, Sep. 2011, 7 pages.

* cited by examiner

REAL-TIME DISCUSSION RELEVANCE FEEDBACK INTERFACE

BACKGROUND

The present invention relates generally to the field of computing, and more particularly to graphical user interfaces.

Meetings are often necessary for groups of people to be productive. Traditional meetings with many people gathered in a single physical room are becoming more rare as people find that using electronic meeting software to conduct meetings online provides benefits in efficiency and reducing travel expenses, among other advantages. This transition to electronic meetings provides opportunities to improve the efficiency of meetings by adding features into the software used to conduct these electronic meetings. Some desirable features may address a common issue regarding meeting discussions that drift off-topic. Such off-topic discussion may waste participants' time, decrease productivity, or may decrease participant engagement in the meeting. These off-topic detours may also cause people to be reluctant to schedule or attend meetings in the first place in order to avoid lost productivity.

SUMMARY

According to one exemplary embodiment, a method for discussion relevance feedback associated with an electronic meeting is provided. The method may include determining a meeting topic associated with the electronic meeting. The method may also include receiving audio data recording the vocal interactions of one or more meeting attendees. The method may further include generating a textual representation of the received audio data. The method may then include identifying a current discussion topic based on the generated textual representation. The method may further include determining a semantic distance between the identified current discussion topic and the determined meeting topic. The method may then include generating discussion relevance feedback based on the determined semantic distance. A computer system and computer program product corresponding to the above method are also disclosed herein. The aforementioned embodiment may be advantageous by providing real-time semantic analysis of discussion topics during an electronic meeting and generating appropriate feedback.

According to at least one embodiment, the method optionally includes presenting the generated discussion feedback to a set of meeting attendees. This may be advantageous by providing the feedback to the attendees who may alter their discussions in order to keep the electronic meeting on-topic.

According to at least one other embodiment, the method optionally displays visual feedback of the discussion relevance via a persistent real-time feedback graphical user interface or in some instances a visual notification presented in response to exceeding a relevance threshold. This may be advantageous by catching the attention of the attendees during the course of an electronic meeting and warning attendees that the current discussion is off-topic.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As stated previously, meetings are often necessary for groups of people to be productive. Traditional meetings with many people gathered in a single physical room are becoming more rare as people find that using electronic meeting software to conduct meetings online provides benefits in efficiency and reducing travel expenses, among other advantages. This transition to electronic meetings provides opportunities to improve the efficiency of meetings by adding features into the software used to conduct these electronic meetings. Some desirable features may address a common issue regarding meeting discussions that drift off-topic. Such off-topic discussion may waste participants' time, decrease productivity, or may decrease participant engagement in the meeting. These off-topic detours may also cause people to be reluctant to schedule or attend meetings in the first place in order to avoid lost productivity.

As such, it may be advantageous to, among other things, provide a system of real-time feedback during meetings that can notify participants when the discussion during the meeting has strayed from the meeting topic. It may also be advantageous to leverage the user interface of the software used to conduct the meeting to display the real-time feedback to one or more of the participants, thus allowing a quick and seamless way to redirect the meeting's discussion back on-topic.

According to at least one embodiment described herein, the speech or vocal interactions of meeting participants may be analyzed. As a participant speaks, the digital voice data collected for distribution to the other meeting participants may be processed using Automatic Speech Recognition (ASR) or similar speech-to-text translation to translate user speech into a textual form for further processing. Thereafter, topic modeling, semantic embedding, or a similar type of automatic linguistic analysis may be performed to detect the semantics of the person's speech. Once the semantics or topics of the person's speech are determined, then the speaker's topic may be compared to the predetermined topic or goals of the meeting. In some embodiments, the semantic distance or semantic similarity between the speaker's topic and the meeting topic may be calculated and then compared to a relevancy threshold. In embodiments, the relevancy threshold may be a user-defined value.

In response to determining that the semantic distance exceeding the relevancy threshold, different actions may be taken based on the particular implementation. In some embodiments, a variety of ways may be employed to warn the speaker that the discussion has drifted off-topic in real-time. For instance, the electronic meeting graphical user interface (GUI) may display a real-time tracker to show one or more participants that the discussion topic has departed from the meeting topic. In other embodiments, portions of the electronic meeting GUI may flash or an eye-catching background color may be displayed to indicate that the discussion is off-topic. In some embodiments, a discussion topic tracker may be displayed in the electronic meeting GUI throughout the meeting and present real-time indicators, such as numerical values or a bar graph, to indicate how close the current discussion topic is to the meeting topic and then present additional stronger indicators, such as a flashing text message in the interface, once the relevancy threshold is exceeded. Other real-time data may be displayed such as the meeting's predefined topic or goal and the currently detected topic of discussion. Further, the interface may display a timer indicating how long a particular topic has been discussed.

In embodiments, the set of users that may be notified regarding off-topic discussion may include the speaker, the meeting leader, some subset of meeting attendees, all meeting attendees, or some other combination of users through the aforementioned GUI. In at least one other embodiment, the system may notify a set of users when a discussion is off-topic by using a separate communication system, such as an instant messaging system, to send an automated message to the set of users.

In other implementations, feedback may be collected and used to generate a post-meeting report that indicates how relevant each speaker's discussion was based on the calculated semantic distance of the discussion topics from the meeting topic. In some embodiments, the post-meeting feedback may indicate the amount of time discussing each topic or subtopic and may also highlight the time spent on off-topic discussion.

In additional embodiments, a user leading or chairing the meeting may interact with a button in the GUI at the start of the meeting, use a voice command, or otherwise signal to the system described herein that the meeting has begun. The system may then analyze the discussion for a predetermined amount of time, for example 5 minutes, to identify the meeting topic. In other embodiments, the user leading the meeting or other designated user may, for example, submit a written meeting agenda or topics written in a calendar invitation when scheduling the meeting that may be analyzed to identify the meeting topics. As described previously, the meeting topic or subtopics may be used to compare to the real-time discussion topics to determine if the meeting discussion has gone off-topic.

The following described exemplary embodiments provide a system, method and program product for discussion topic relevance feedback. As such, the present embodiment has the capacity to improve the technical field of user interfaces by displaying real-time feedback to electronic meeting attendees indicating when the discussion has moved off-topic. More specifically, the meeting topics are determined, the speakers' vocal interactions are recorded and then converted into text which is analyzed in real-time to determine the topic the speakers are currently discussing. Then, the identified current topic of discussion is compared to the meeting topic to determine the semantic distance between the two topics. If the semantic distance exceeds a relevance threshold, real-time feedback is generated and presented to meeting attendees indicating that the current discussion is off-topic.

As used herein, electronic meetings may include two or more people discussing one or more topics facilitated by electronic means of transmitting or presenting audio or video. Electronic meetings may be conducted online. It may be appreciated that the embodiments described herein may also be used in conjunction with meetings that, in whole or in part, are held in a physical location with participants at the physical location. In such instances, a device executing software incorporating the discussion relevance feedback program may collect audio from participants speaking at the physical location and may still provide real-time feedback about off-topic discussion identified in accordance with the present disclosure via on-screen GUI or generate post-meeting reports.

Figure 1:
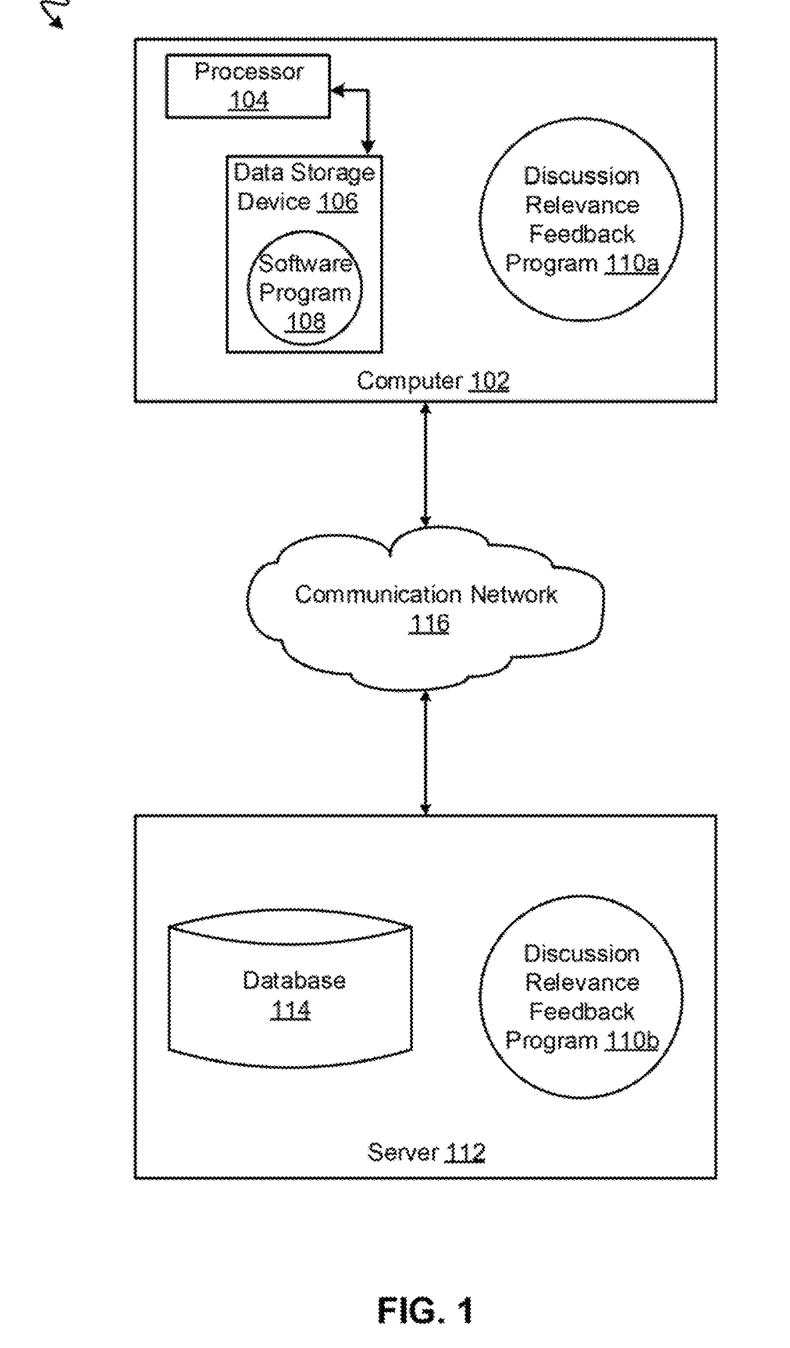
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a discussion relevance feedback program 110a. The networked computer environment 100 may also include a server 112 that is enabled to run a discussion relevance feedback program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the discussion relevance feedback program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the discussion relevance feedback program 110a, 110b (respectively) to provide real-time feedback to electronic meeting attendees when discussion has gone off-topic, thereby helping to keep electronic meetings focused, efficient, and effective. The discussion relevance feedback method is explained in more detail below with respect to FIGS. 2, 3A, and 3B.

Figure 2:
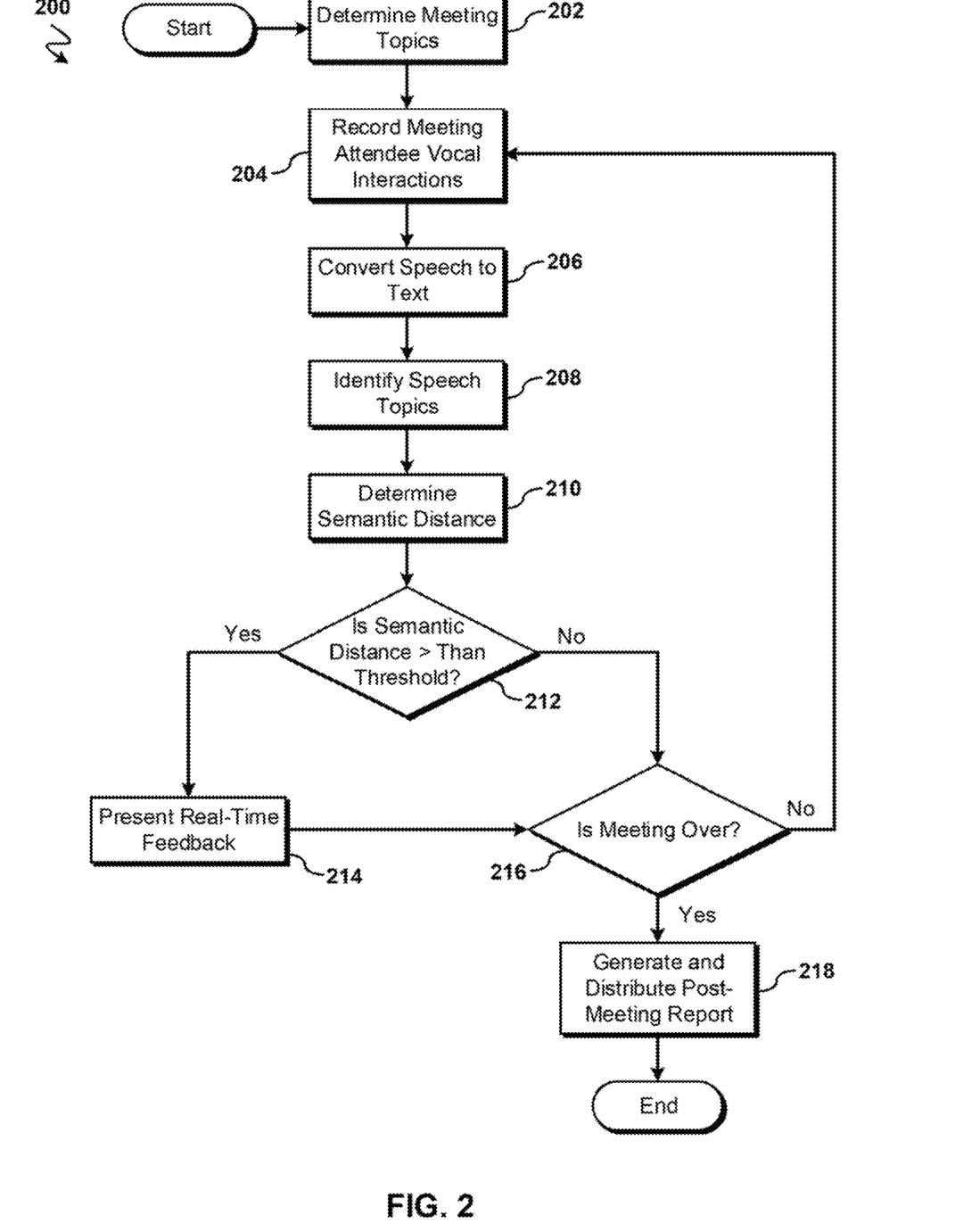
FIG. 2 is an operational flowchart illustrating a process for the discussion relevance feedback according to at least one embodiment.

Referring now to FIG. 2, an operational flowchart illustrating the exemplary discussion relevance feedback process 200 used by the discussion relevance feedback program 110a and 110b according to at least one embodiment is depicted.

At 202 the discussion relevance feedback process 200 determines one or more topics of an electronic meeting. According to at least one embodiment, application programming interfaces (APIs) for software used to schedule and conduct electronic meetings may be used to identify meeting topics. For example, if a team leader schedules a meeting to discuss a new memory controller, the team leader may use calendar software to identify a meeting time, title the meeting "Memory Controller Planning Session," and attach a text document with a meeting agenda. The topic of the meeting may be determined by obtaining the meeting title from the calendar software, in this case, the title "Memory Controller Planning Session" may be obtained and the text string analyzed to determine that the topic of the meeting involves memory controllers. Additionally, or alternatively, to analyzing the meeting title, the attached text agenda may be analyzed to determine one or more topics and subtopics for the meeting.

In other embodiments, a predefined portion of the meeting audio may be analyzed to determine meeting topics. Using methods that will be described in more detail below, the speech of a speaker at the start of the electronic meeting may be recorded, converted into text, and then analyzed to determine meeting topics since many meetings begin by introducing the topic of the meeting. For example, the first speaker in a meeting may begin by stating "Thank you all for attending this meeting so we can discuss the new memory controller we have to design for our upcoming release." Based on the analysis from these introductory statements, topic of the meeting may be identified as memory controller design. The amount of time recorded at the beginning of the meeting may be set by a user before the meeting starts. According to some embodiments, the start of the meeting may by determined in response to user interaction with a button or gesture made within a user interface presented on an electronic device (e.g., computer 102). In other embodiments, a user may indicate the start of a meeting through a voice command or a spoken keyword that is processed and identified as a trigger indicating the start of the meeting.

According to other embodiments, recordings or agendas of prior meetings that have similar titles, were held at similar times, or had similar participants to an upcoming meeting may be analyzed to determine the topics of the similar prior meetings. These methods may be used to predict the meeting topics of the similar upcoming meeting.

Next, at 204, the vocal interactions (i.e., speech) of the meeting attendees is recorded. Electronic devices, such as mobile devices, may be used to record the speech of meeting attendees through built-in or external microphones. The vocal interactions of meeting attendees are typically captured by an electronic device and transmitted via a communication network 116 in order to conduct an online electronic meeting. As such, according to at least one embodiment, the recorded and collected audio data of the attendees used by the meeting software may be made accessible to the discussion relevance feedback process 200 for analysis. In other embodiments, the vocal interactions of the attendees may be recorded concurrently with the meeting software as a separate recording. The vocal interactions of the attendees may be stored as audio files (e.g., as a compressed MP3 or uncompressed WAV files) in a data storage device 106.

Then, at 206, the audio data capturing the attendees' speech is converted into textual data. Numerous known Automatic Speech Recognition (ASR) or speech-to-text algorithms may be employed to convert the recorded meeting audio data into textual data for further analysis. The particular algorithm used to make the conversion may depend on the specific implementation and design requirements for relevance feedback. In some embodiments, real-time feedback is a component of the feedback output and as such an algorithm with higher performance may be selected. In other embodiments, the feedback output may be focused on an after-meeting report, in which case a slower performance algorithm may be acceptable in order to increase accuracy. Various forms of feedback output will discussed in further detail below.

According to at least one embodiment, the ASR algorithm may be trained on prior speech recordings of the user and the user's frequent collaborators to improve ASR accuracy. Prior speech recording may, for example, be saved from prior instances of the discussion relevance feedback process 200 or recordings saved by the electronic meeting software. These recordings may be stored in a data storage device 106 with metadata indicating the users speaking in portions of the recordings. Then, the prior recordings with user metadata matching or similar to the users involved in the current meeting may be retrieved and used as training input for the ASR algorithm.

At 208, the textual data generated previously is analyzed to identify the current topics being discussed by the attendees. According to at least one embodiment, the textual data, i.e., transcript of the vocal interactions of the attendees, may be used to perform topic modelling or other semantic analysis to identify one or more topics that are being discussed. It should be appreciated that other forms of automatic linguistic analysis may be performed, such as semantic embedding, to identify topics from textual data sources. For example, the results of the automatic linguistic analysis may analyze a text document transcript of the current meeting discussion and identify that the speaker is currently discussing their pets.

Next, at 210, the semantic distance between the current identified topics of discussion and the previously identified topics or goal of the meeting is determined. As discussed previously, the topics or goals of the meeting were already identified. Additionally, the current discussion topics of speakers at the electronic meeting are also identified. With these two sets of topics identified, known semantic distance or semantic similarity calculations may be used to determine the semantic distance between the current discussion topics and the meeting topics. The resulting semantic distance value indicates how closely related the current discussion topics are to the meeting topics. Continuing the prior examples, if the discussion topic is pets and the meeting topic is memory controllers, the resulting semantic distance value may be a large value, such as 0.9 on a scale of 0 to 1, with 1 representing high semantic dissimilarity. However, if the discussion topic was memory hierarchy and the meeting topic was memory controllers, the resulting semantic distance value may be small, such as 0.1 on a scale from 0 to 1.

Then, at 212, the calculated semantic distance is compared to a relevance threshold value. According to at least one embodiment, the relevance threshold value may be a predefined semantic distance value set by the meeting leader or some other designated user. In some embodiments, the user may be presented with a graphical user interface (GUI) allowing the user to define a relevance threshold value before a meeting. According to other embodiments, the user may be presented with a slider presented in a GUI that may be dragged by the user between tightly focused or free-wheeling ends of a spectrum. This slider position may then be translated into an appropriate semantic distance value which is used as the relevance threshold value. In embodiments, the relevance threshold may be set prior to a meeting. In other embodiments, a user may have the option to set and readjust the relevance threshold in real-time during the meeting in order to control the flow of the meeting. For example, Bill needs to lead an upcoming meeting and feels that recent meetings have wandered into irrelevant topics and thus sets the semantic distance threshold to 0.4 instead of the 0.6 value used in prior meetings.

If the calculated semantic distance exceeds the threshold at 212, then real-time feedback is presented to one or more meeting attendees at 214. Feedback may be generated and presented in a variety of forms, including combinations of feedback, based on the embodiment. For example, feedback may include persistent real-time feedback, real-time feedback presented in response to trigger condition, or a combination thereof. In some embodiments incorporating persistent real-time feedback, the real-time feedback will always be updated after the threshold comparison, regardless of the outcome, and additional feedback may be provided to indicate when the threshold has been exceeded.

According to at least one embodiment, real-time relevance feedback may be a persistent display shown to a set of attendees, or all attendees, via a graphical user interface (GUI). In some embodiments, the persistent real-time relevance feedback may be integrated into the electronic meeting software, a plug-in (or other type of add-on) for the electronic meeting software, or as a separate program run while the electronic meeting occurs. Embodiments may include a portion of a screen of an attendee's computer 102 showing a GUI indicator displaying the current semantic distance between the current discussion topic and the meeting's designated topic for the current time.

This GUI indicator may take a variety of forms, such as a numerical value indicating the semantic distance between the current discussion and the intended meeting topic identified earlier. The numerical value may also indicate the threshold value. For example, the GUI may display "78/100" to indicate the current semantic distance is 78 and the threshold is 100. Other embodiments may label the values for the attendees, such as "Current Topic Relevance=78" and "Threshold Relevance=100." This numerical value may update in real-time to indicate if the discussion is moving further off-topic, returning closer to the intended topic, or not changing semantic distance from the intended topic. According to some embodiments, the attributes of the text depicting the values in a GUI may be altered to indicate additional information to the attendees. For example, the text may be bolded, font style changed, font color changed, or font size increased, to indicate if the topic has exceeded the threshold or not.

According to at least one other embodiment, the GUI relevance indicator may take the form of an arrow that is displayed on screen with a direction indicating the change in relevance of the current discussion in real-time. For example, an arrow pointing up may indicate that the discussion is moving more off-topic (i.e., semantic distance increasing) and an arrow down may indicate the discussion is becoming more relevant and on-topic (i.e., semantic distance decreasing). Another arrow direction or symbol, such as a dash, may indicate the relevance of the current discussion is not changing. Other embodiments may integrate color changes, size changes, or other visual attributes that may be adjusted to convey relevance information to the attendees. For example, an up arrow indicating that the discussion is trending more off-topic may also be colored red to indicate the discussion is moving away from the intended topic. On the other hand, an arrow pointed down may be colored green to indicate that the discussion is moving back on-topic. In other embodiments, the color of the arrow may indicate if the relevance threshold has been exceeded. For example, if the current discussion's semantic distance has not exceeded the relevance threshold, the up or down arrow indicator may be green, turn yellow when the discussion is close to the relevance threshold without exceeding the relevance threshold, and the arrow indicator may turn red when the relevance threshold has been exceeded.

In other embodiments, persistent real-time relevance feedback may be presented as a box or other screen portion that may display data related to the current discussion and the intended topic. For example, the GUI may include a rectangular shape with data indicating the current topic being discussed based on the topic modelling described previously. This may be identified in the GUI as the current discussion topic. Additionally, in some embodiments the GUI may indicate the intended topic. The GUI may also include a timer indicating the amount of time spent on the current topic. Other embodiments may also include a GUI representation of the current discussion's relevance to the intended topic. Some embodiments may display the discussion relevance using numerical values or arrows, as described previously. Other embodiments may use bar graphs or other visual indicators to convey the relevance of the current discussion to the intended topic. Persistent real-time relevance feedback is described in more detail below with respect to a specific example in FIGS. 3A and 3B.

According to at least one other embodiment, real-time feedback may be presented to the attendees in response to exceeding the relevance threshold. Consequently, in some embodiments, no relevance indicators may be presented to attendees during a meeting unless the relevance threshold has been exceeded. As such, the electronic meeting GUI may be unaltered until the relevance threshold is exceeded, at which point a notification is presented to the attendees. In some embodiments, a visual notification may be generated and presented to the attendees. For example, a dialog box or other visual GUI element may be presented on a device screen to attendees indicating that the discussion is now off-topic or suggesting the attendees to return to the intended topic. According to some embodiments, user interaction via an onscreen button or a predefined gesture may dismiss the notification until discussion relevance has fallen below the threshold and subsequently exceeded the threshold again, at which time the notification may be presented again.

According to at least one other embodiment, real-time relevance feedback may be presented as an audio indicator that may be presented in conjunction with the visual indicator described above. For example, concurrently with presenting a dialog box indicating the current discussion has exceeded the relevance threshold, an audio file of a prerecorded voice may be played which states that the discussion is now off-topic, "please return to the meeting topic," or a similar message. According to other embodiments, the audio indicator may include an alarm sound. According to at least one embodiment, the audio indicator may be the only indicator presented to attendees.

In alternative embodiments, exceeding the relevance threshold may include sending notifications through existing messaging systems. For example, instant messages may be generated and sent to meeting attendees indicating the discussion is off-topic. Other messaging systems may be used such as email or text messages sent via smartphone. To send out external messages, the discussion relevance feedback process 200 may use the APIs of an external messaging system to send out automated messages to the attendees.

As noted above, the feedback generated and presented may be presented to all attendees or to a subset (e.g., the meeting leader). In some embodiments, the attendees receiving the relevance feedback may be selected by the meeting leader when setting up a meeting. In other embodiments, the meeting leader or other designated user may select in real-time which attendees will receive the real-time relevance feedback.

According to some embodiments, no real-time feedback is generated or presented. Instead, the discussion relevance along with other data (e.g., time spent on a topic, each speaker's percentage of time spent talking about relevant or irrelevant topics) may be recorded and later used to generate an after-meeting report, as will be discussed in greater detail below.

However, if the calculated semantic distance does not exceed the threshold at 212, or if real-time feedback was presented to one or more meeting attendees at 214, then discussion relevance feedback process 200 will determine if the electronic meeting is over at 216. According to at least one embodiment, the discussion relevance feedback process 200 may determine that a meeting is over by querying the electronic meeting software and receiving a response indicating the electronic meeting has ended. Other embodiments may receive a user response from pressing a GUI button to end the meeting or other express indication from one or more attendees. According to another embodiment, the discussion relevance feedback process 200 may determine the electronic meeting is over once there are no more attendees connected to the electronic meeting.

If discussion relevance feedback process 200 determined that the electronic meeting is not over at 216, the discussion relevance feedback process 200 will return to 204 to continue to record more of the meeting discussion, evaluate discussion relevance, and provide feedback.

If, however, discussion relevance feedback process 200 determined that the electronic meeting is over at 216, then, a post-meeting report is generated and distributed to a set of meeting attendees at 218. In some embodiments, a post-meeting report may be generated for each attendee that spoke at the electronic meeting. The individualized post-meeting report may summarize the topics the attendee discussed and the relevance of each of the attendee's topics to the meeting topic. For example, the post meeting report may indicate that attendee Ai discussed topics $T_1$, $T_2$, and $T_3$, with semantic distances of 0.3, 0.5, and 0.1, respectively, from the meeting topic $T_m$. Additionally, or alternatively, the overall relevance of the attendee's discussion to the meeting topic may be summarized in the post-meeting report, for example, by averaging the semantic distances of the topics the attendee spoke about during the electronic meeting. According to some embodiments, the post-meeting report may summarize how much time was spent discussing each topic, either by individual speakers or aggregated across multiple speakers. Additionally, topics that exceeded the relevance threshold may be identified in the post-meeting report together with the amount of time the discussion revolved around topics exceeding the relevance threshold. The post-meeting report may be distributed via email or other electronic messaging systems and include a copy of the report in the body of the message or as a data file attached to the message. According to some embodiments, the post-meeting report may be displayed via a GUI at the end of the meeting. It may be appreciated that in some embodiments the real-time relevance feedback may be the only feedback given and that when the electronic meeting ends, the discussion relevance feedback process 200 may end without generating a post-meeting report.

Figure 3A:
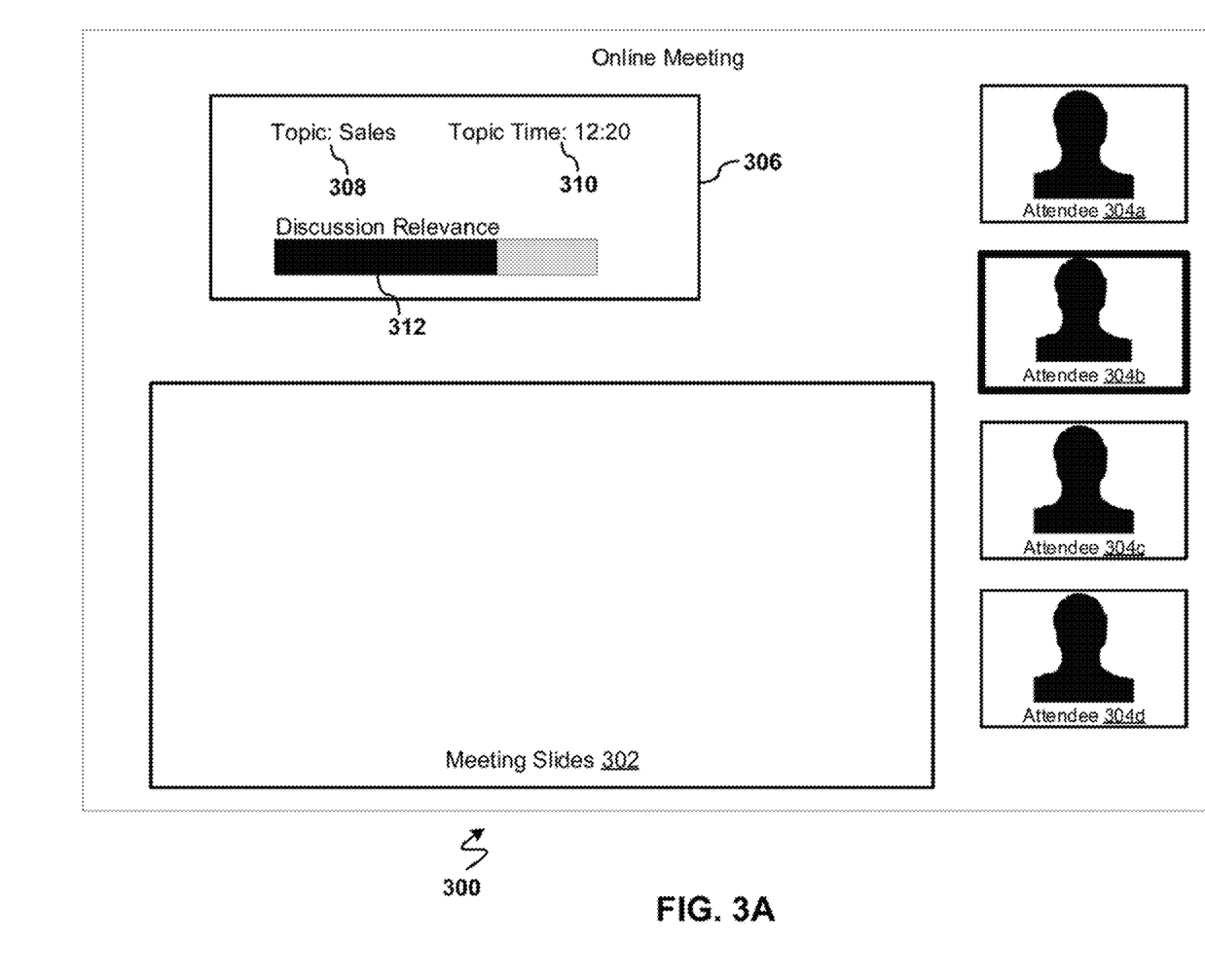
FIGS. 3A and 3B depict exemplary persistent real-time relevance feedback according to at least one embodiment.
Figure 3B:
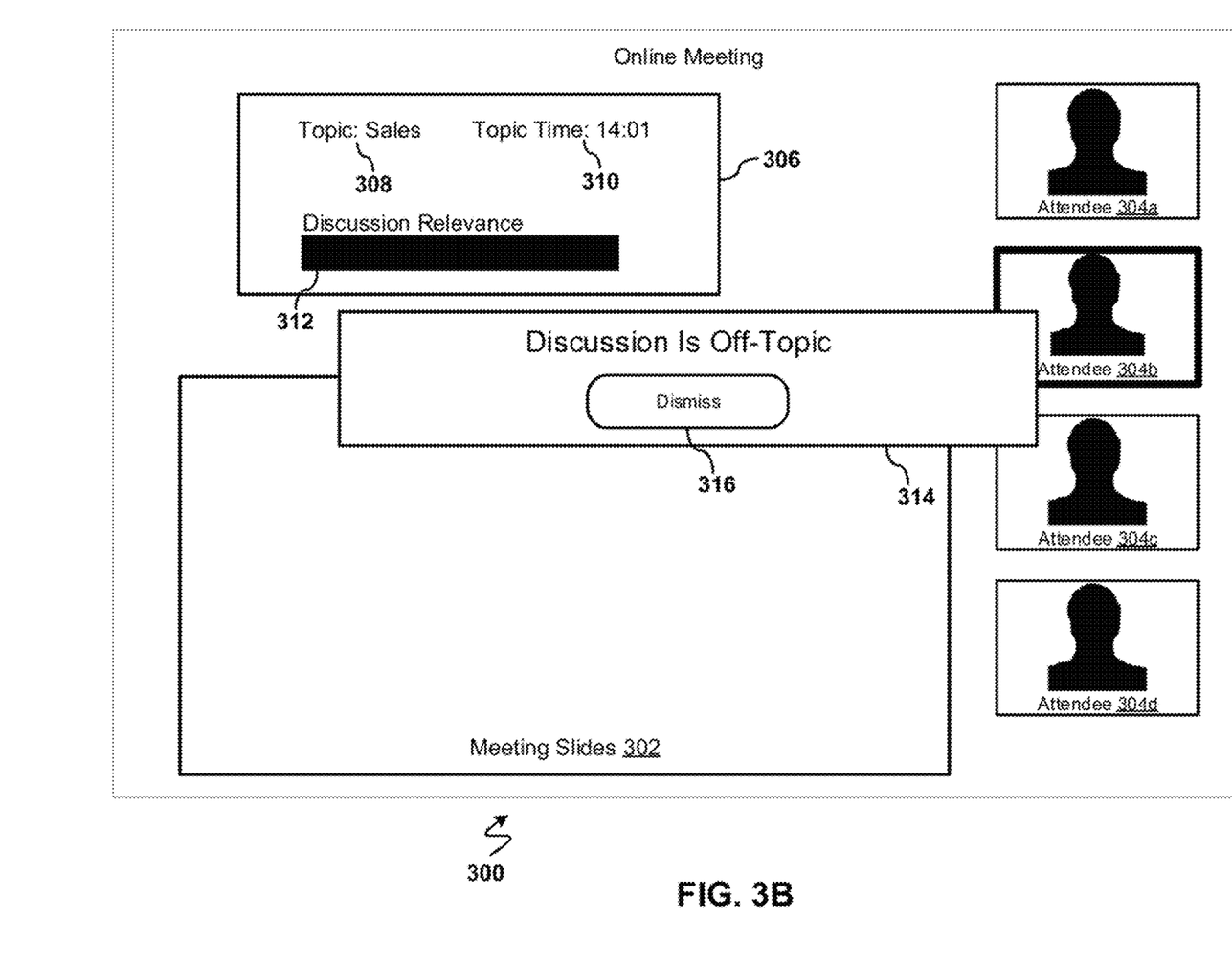

Referring now to FIGS. 3A and 3B, an example of persistent real-time relevance feedback is depicted in accordance with at least one embodiment. An exemplary online meeting GUI 300 is illustrated that displays meeting slides 302 and meeting attendees 304a-d. Additionally, the online meeting GUI 300 displays a persistent relevance feedback GUI 306. As depicted, the intended topic 308 that should be discussed currently, "sales," is displayed. The intended topic 308 shown in the persistent relevance feedback GUI 306 is determined according to step 202, discussed above. Additionally, the topic time 310 "12:20" depicted in the persistent relevance feedback GUI 306 indicates the amount of time spent on the current topic. The discussion relevance 312 is shown as a bar graph indicating how close the current topic's semantic distance is to the relevance threshold. As depicted, the discussion relevance 312 shows that the semantic distance of the current discussion topic, as determined above in step 210, is approximately three fourths from the relevance threshold.

FIG. 3B depicts a visual notification 314 displayed in the online meeting GUI in response to the current topic's semantic distance exceeding the relevance threshold, as described previously with respect to step 214. As shown in FIG. 3B, the visual notification 314 is a dialog box displaying the character string "Discussion Is Off-Topic" and a GUI element providing a dismissal button 316 that allows an attendee 304a-d to dismiss the visual notification 314. In the example depicted in FIG. 3B, the topic time 310 has progressed 101 seconds from the example depicted in FIG. 3A. Moreover, the discussion relevance 312 bar graph extends to the rightmost boundary, thereby visually indicating that the relevance threshold has been exceeded based on the determination described above at step 212. Thus, FIG. 3B depicts an example of a discussion during a meeting that in 101 seconds has drifted more off-topic to the point that the discussion relevance feedback process 200 has determined that the relevance threshold has been exceeded and reacts accordingly. With the visual notification 314 presented to one or more attendees 304a-d, the current speaker, attendee 304b, may realize that the discussion has drifted off-topic and re-focus the meeting's discussion to return to the intended topic of discussion. As such, attendee 304b reacting to the visual notification 314 and redirecting the meeting discussion will help the meeting more effective, efficient, and productive.

It may be appreciated that while FIGS. 3A and 3B depict examples in accordance with some embodiments using persistent real-time feedback, the visual notification 314 in FIG. 3B may also depict a similar visual notification 314 used in embodiments that do not present persistent real-time feedback. In such instances, the persistent relevance feedback GUI 306 in FIG. 3B may not be present and the visual notification 314 would be presented in response to the relevance threshold being exceeded. Consequently, the only GUI relevance feedback for an attendee 304a-d would be the visual notification 314. As described previously, in some embodiments an audio notification may accompany the visual notification 314. Additionally, the visual notification 314 may take a variety of other forms.

It may be appreciated that FIGS. 2, 3A, and 3B provide only an illustration of one embodiment and do not imply any limitations with regard to how different embodiments may be implemented. Many modifications to the depicted embodiment(s) may be made based on design and implementation requirements.

According to at least one other embodiment, determining meeting topics at 202 may further include analyzing an agenda or other meeting data that indicates a defined amount of time to spend on a given topic. As such, the discussion relevance feedback process 200 may determine at 212 if the threshold distance was exceeded or the predefined amount of time for the current topic has been exceeded. If the predefined amount of time for the topic is exceeded at 212, then the real-time feedback presented at 214 may include a message indicating that the discussion topic has run over time and encourage the attendees 304a-d to move on to the next topic to stay on schedule.

As described in embodiments above, the discussion relevance feedback program 110a and 110b may improve the functionality of a computer or another technology by generating and presenting real-time relevance discussion feedback in a GUI that improves the functionality of electronic meeting software. More specifically, electronic meeting software is improved by analyzing discussion topics in real-time and presenting users with notifications regarding the relevance of the current discussion. This improves the GUI of electronic meeting software by incorporating new GUI features that enhance electronic meeting attendees' experiences and satisfies the goal of improving electronic meeting effectiveness. The discussion relevance feedback program 110a and 110b provides user-defined, consistent, repeatable, automatic relevance threshold application to meeting discussions that will result in more focused and productive meetings through GUI-based feedback.

Figure 4:
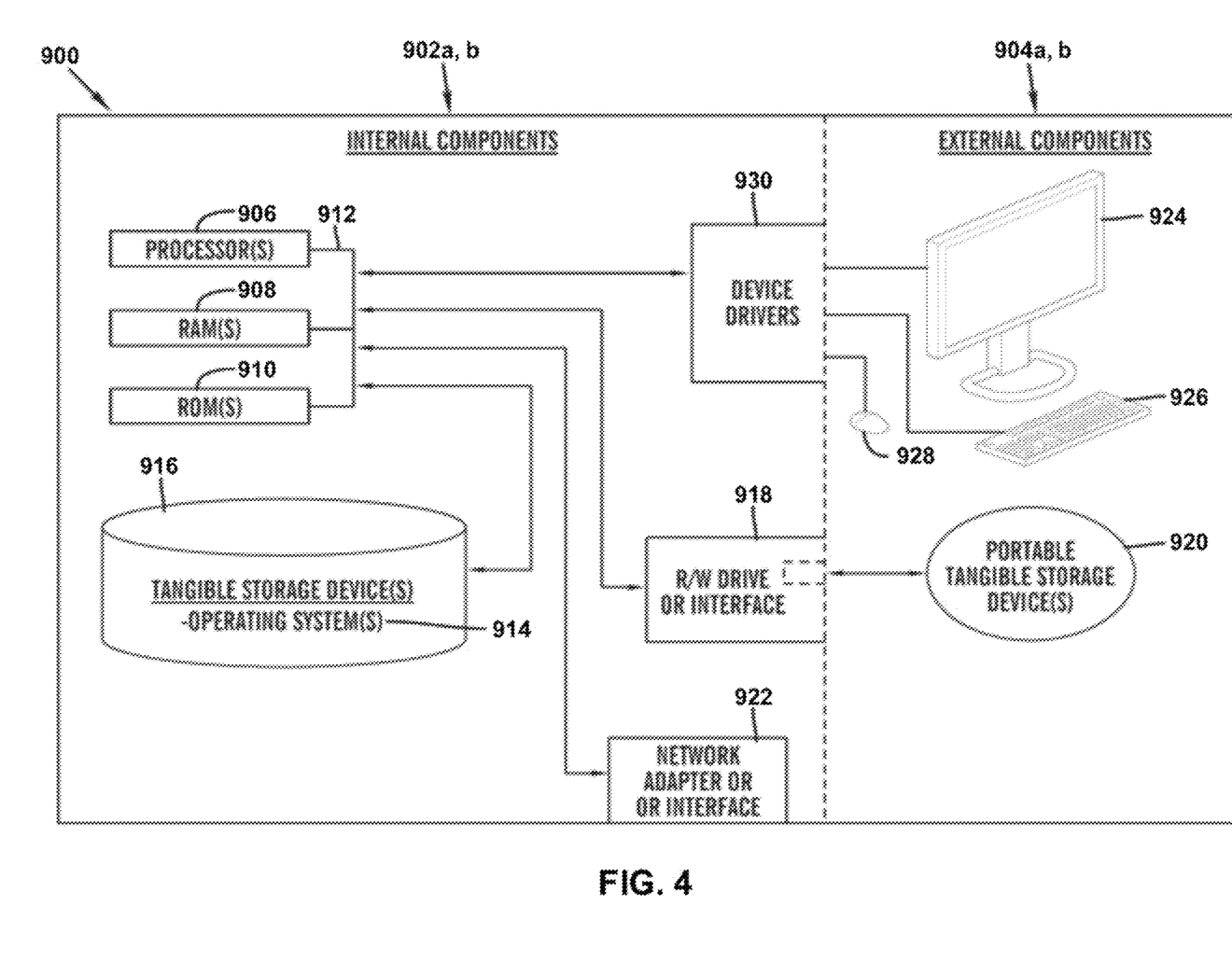
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the discussion relevance feedback program 110a in client computer 102, and the discussion relevance feedback program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the discussion relevance feedback program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the discussion relevance feedback program 110a in client computer 102 and the discussion relevance feedback program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the discussion relevance feedback program 110a in client computer 102 and the discussion relevance feedback program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
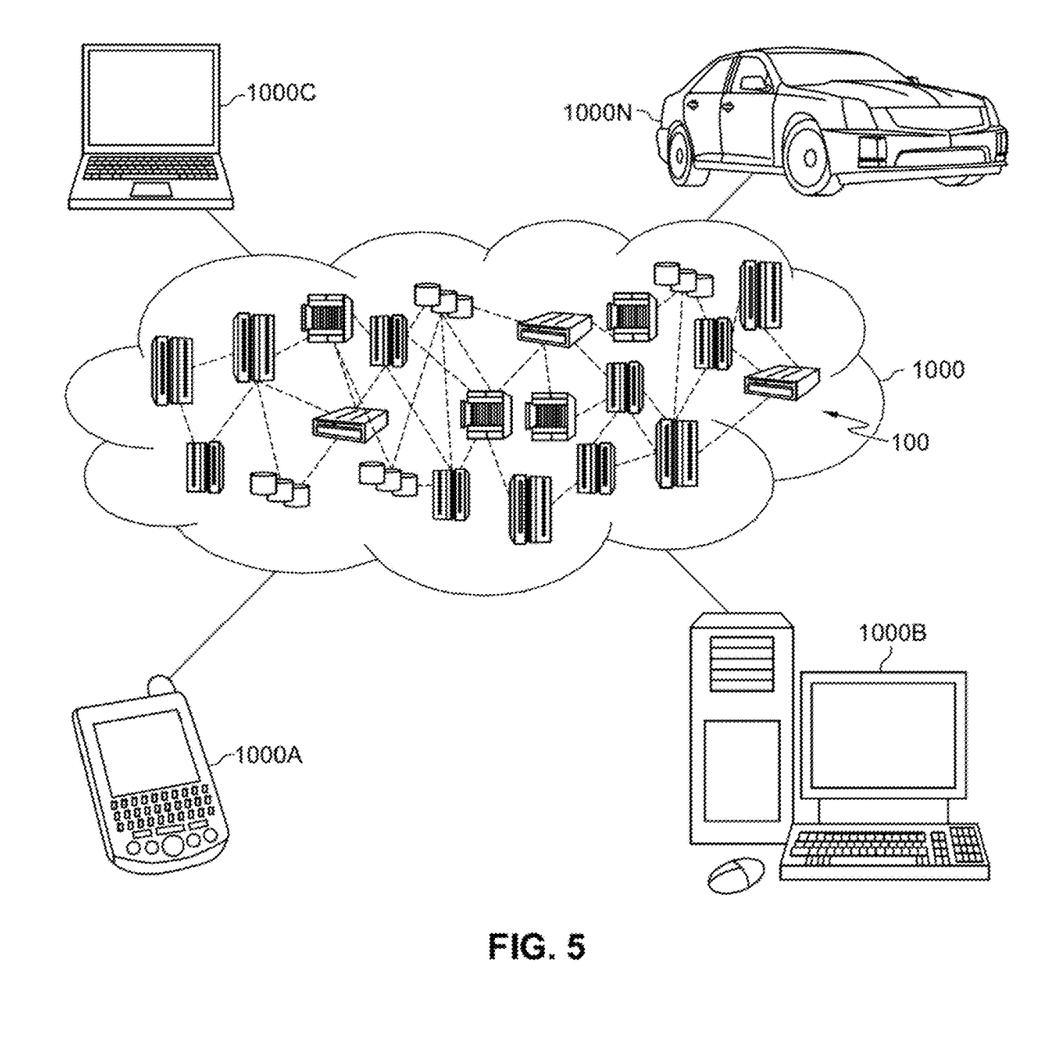
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
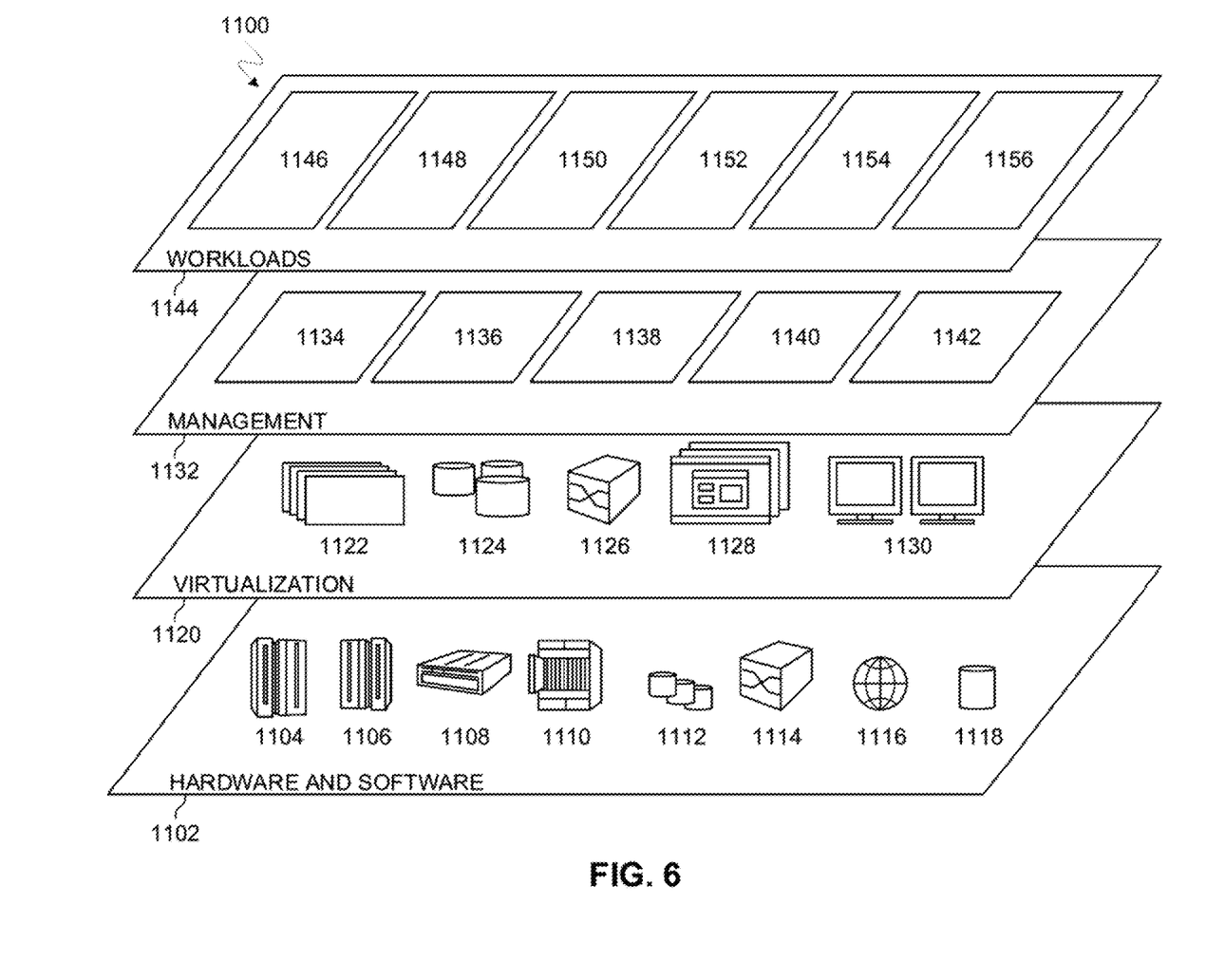
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and discussion relevance feedback 1156. A discussion relevance feedback program 110a, 110b provides a way to generate and display discussion relevance feedback to meeting attendees in real-time.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for discussion relevance feedback associated with an electronic meeting, the method comprising:
   determining a meeting topic associated with the electronic meeting;
   receiving audio data recording vocal interactions of one or more meeting attendees;
   generating a textual representation of the received audio data;
   identifying a current discussion topic based on the generated textual representation;
   determining a semantic distance between the identified current discussion topic and the determined meeting topic; and
   generating discussion relevance feedback based on the determined semantic distance, wherein the generated discussion relevance feedback includes a degree of relevance.

2. The computer-implemented method of claim 1, further comprising:
   presenting the generated discussion feedback to a set of meeting attendees.

3. The computer-implemented method of claim 1, wherein the generated discussion relevance feedback includes visual feedback.

4. The computer-implemented method of claim 3, wherein the visual feedback is selected from the group consisting of a persistent real-time feedback graphical user interface (GUI) and a visual notification displayed in response to determining the determined semantic distance exceeds a relevance threshold value.

5. The computer-implemented method of claim 1, wherein the generated discussion feedback includes generating a post-meeting report summarizing the determined semantic distance of one or more discussion topics that were identified throughout the electronic meeting.

6. The computer-implemented method of claim 5, wherein the generated post-meeting report is individualized for a meeting attendee by listing one or more topics the attendee discussed during the electronic meeting and the determined semantic distance of the one or more topics from the determined meeting topic.

7. The computer-implemented method of claim 1, wherein the generated discussion feedback further comprises:
   real-time feedback indicating whether the current discussion topic is tending in a more relevant or less relevant direction, or not changing in relevance.

8. A computer system for discussion relevance feedback associated with an electronic meeting, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   determining a meeting topic associated with the electronic meeting;
   receiving audio data recording vocal interactions of one or more meeting attendees;

generating a textual representation of the received audio data;

identifying a current discussion topic based on the generated textual representation;

determining a semantic distance between the identified current discussion topic and the determined meeting topic; and generating discussion relevance feedback based on the determined semantic distance, wherein the generated discussion relevance feedback includes a degree of relevance.

9. The computer system of claim 8, further comprising:

presenting the generated discussion feedback to a set of meeting attendees.

10. The computer system of claim 8, wherein the generated discussion relevance feedback includes visual feedback.

11. The computer system of claim 10, wherein the visual feedback is selected from the group consisting of a persistent real-time feedback graphical user interface (GUI) and a visual notification displayed in response to determining the determined semantic distance exceeds a relevance threshold value.

12. The computer system of claim 8, wherein the generated discussion feedback includes generating a post-meeting report summarizing the determined semantic distance of one or more discussion topics that were identified throughout the electronic meeting.

13. The computer system of claim 12, wherein the generated post-meeting report is individualized for a meeting attendee by listing one or more topics the attendee discussed during the electronic meeting and the determined semantic distance of the one or more topics from the determined meeting topic.

14. The computer system of claim 8, wherein the generated discussion feedback further comprises:

real-time feedback indicating whether the current discussion topic is tending in a more relevant or less relevant direction, or not changing in relevance.

15. A computer program product for discussion relevance feedback associated with an electronic meeting, comprising a computer-readable storage medium having program instructions embodied therewith, the program instructions executable by a processor to cause the processor to perform a method comprising:

determining a meeting topic associated with the electronic meeting;

receiving audio data recording vocal interactions of one or more meeting attendees;

generating a textual representation of the received audio data;

identifying a current discussion topic based on the generated textual representation;

determining a semantic distance between the identified current discussion topic and the determined meeting topic; and generating discussion relevance feedback based on the determined semantic distance, wherein the generated discussion relevance feedback includes a degree of relevance.

16. The computer program product of claim 15, further comprising:

presenting the generated discussion feedback to a set of meeting attendees.

17. The computer program product of claim 15, wherein the generated discussion relevance feedback includes visual feedback.

18. The computer program product of claim 17, wherein the visual feedback is selected from the group consisting of a persistent real-time feedback graphical user interface (GUI) and a visual notification displayed in response to determining the determined semantic distance exceeds a relevance threshold value.

19. The computer program product of claim 15, wherein the generated discussion feedback includes generating a post-meeting report summarizing the determined semantic distance of one or more discussion topics that were identified throughout the electronic meeting.

20. The computer program product of claim 15, wherein the generated discussion feedback further comprises:

real-time feedback indicating whether the current discussion topic is tending in a more relevant or less relevant direction, or not changing in relevance.

\* \* \* \* \*